W. N. WHITE.

No. 4,627.
Reissued Nov. 7, 1871.

LAMP HEATING APPARATUS.

Witnesses.
Willette Anderson
J. M. Hayne

Inventor.
W. N. White,
Chipman & Osmun & Co
Attys.

AM. PHOTO-LITHOGRAPHIC CO. N.Y. (OSBORNE'S PROCESS.)

UNITED STATES PATENT OFFICE.

WINDSOR NEWTON WHITE, OF WINCHENDON, MASSACHUSETTS.

IMPROVEMENT IN LAMP-HEATERS.

Specification forming part of Letters Patent No. 108,863, dated November 1, 1870; reissue No. 4,627, dated November 7, 1871.

*To all whom it may concern:*

Be it known that I, WINDSOR NEWTON WHITE, of Winchendon, in the county of Worcester and State of Massachusetts, have invented a new and useful Heating Apparatus for Lamps provided with Chimneys; and I do hereby declare the same to be fully described in the following specification, and represented in the accompanying drawing, of which—

Figure 1:
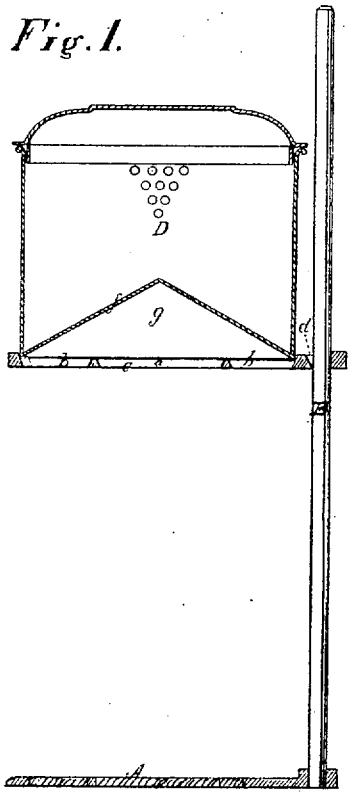
Figure 2:
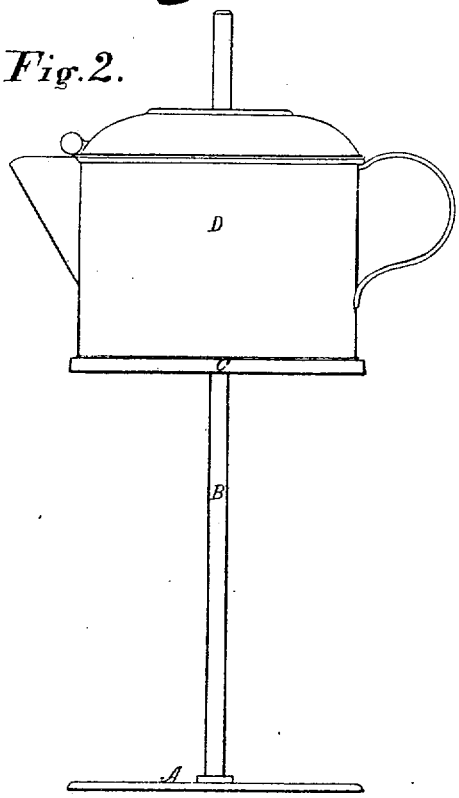
Figure 3:
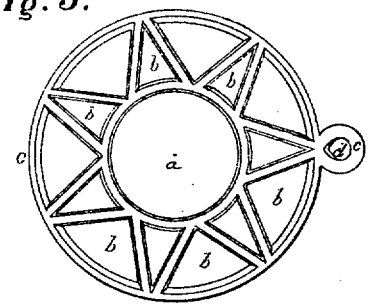
Figure 5:
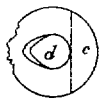
Figure 6:
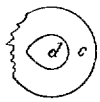
Figure 4:
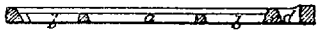
Figure 7:
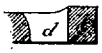

Figure 1 represents a vertical central section; Fig. 2, a front elevation. Fig. 3 is a top view; and Fig. 4, a vertical central section of the supporting-shelf. Figs. 5, 6, and 7 are details.

The object of this invention is to provide a means for readily supporting a vessel of water or other liquid above the chimney of the ordinary kerosene lamp; and it consists in the construction and novel arrangement of the supporting-stand and the automatic clamp-shelf, hereinafter described.

In the drawing, A denotes a base-plate or platform provided with a rod or standard, B, the lower end of which is secured to the base-plate A near its periphery. This base-plate is usually provided with a slightly elevated rim or guard in order to indicate the proper position of the lamp, the base of which is designed to rest on the said plate. On the rod or standard B slides the supporting-shelf C. This shelf consists of a disk or platform, in the center of which is a circular opening, *a*, for the reception of the upper end of the lamp-chimney, when the lamp is resting on the base A of the stand. Around the central opening *a* is formed a number of smaller holes or passages, *b*, as shown in Fig. 3 of the drawing. From the periphery of the shelf C an ear, *c*, is extended, through which a passage, *d*, is made to receive the supporting-rod B. The form of this passage *d* is peculiar and provides a means for retaining the shelf at any desired height on the rod, thus dispensing entirely with the use of a clamp-screw. The rear half of the passage is semi-cylindrical or thereabout, the wall or side of the passage in this part being at right angles, or about so, with the plane of the base or bottom of the passage. The front half is an angular notch, having its sides inclined downward and inward to the base of the passage. It is apparent, therefore, that the upper opening of the passage *d* is larger than the lower opening. The form of this passage through the lug *c* is clearly illustrated in the detailed views, Figs. 5, 6, and 7 of the drawing. The first of these figures represents a top view; the second, a bottom view; and the third a vertical section of the ear on an enlarged scale, from which it is apparent that in plan view the passage is somewhat oval in form. On the shelf C the boiler or vessel D for holding the liquid to be heated is placed. The bottom *f* of this vessel is formed with a conical recess or concavity, *g*, as represented. The heat from the flame escaping from the top of the chimney will pass into the recess of the bottom of the vessel D, and will diverge and act on all parts of said bottom, finally escaping through the series of openings *b* in the shelf. The construction of the shelf and the bottom of the heating-vessel is designed to be especially favorable for securing distribution of the heat, and its absorption by the liquid contents of the vessel. As the shelf can be adjusted at any height on the rod, the attachment may be readily suited to a lamp of any ordinary size. And the degree of heat may be lowered by raising the shelf on the rod away from the end of the chimney.

I claim—

1. The apparatus herein described, consisting of the vessel D provided with recessed bottom, and the shelf C having the central chimney-inlet *a*, and the surrounding escape passages *b*, substantially as specified.

2. In lamp-cooking apparatus a shelf, C, provided with the clamping-passage *d*, constructed to operate automatically on a supporting-rod passing through it, substantially as specified.

3. In lamp-heating apparatus, the combination, with the rod B and vessel D, of the adjustable annular shelf C, having rod-receiving passage *d*, substantially as specified.

In testimony that I claim the above I have hereunto subscribed my name in the presence of two witnesses.

WINDSOR NEWTON WHITE.

Witnesses:

NELSON D. WHITE,

E. S. MERRILL.